(12) United States Patent  
Suzuki

(10) Patent No.: US 8,373,870 B2
(45) Date of Patent: Feb. 12, 2013

(54) INFORMATION PROCESSING APPARATUS AND CONTROL METHOD THEREOF

(75) Inventor: Ryousuke Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 362 days.

(21) Appl. No.: 12/672,068

(22) PCT Filed: Sep. 18, 2008

(86) PCT No.: PCT/JP2008/067371
§ 371 (c)(1),
(2), (4) Date: Feb. 3, 2010

(87) PCT Pub. No.: WO2009/047986
PCT Pub. Date: Apr. 16, 2009

(65) Prior Publication Data
US 2010/0214586 A1 Aug. 26, 2010

(30) Foreign Application Priority Data

Oct. 9, 2007 (JP) ................................. 2007-263822

(51) Int. Cl.
*G06F 15/00* (2006.01)
*G06F 15/177* (2006.01)

(52) U.S. Cl. .......................................... 358/1.13; 713/2

(58) Field of Classification Search .................. 358/1.13
See application file for complete search history.

(56) References Cited

U.S. PATENT DOCUMENTS

| 6,438,708 | B1 | 8/2002 | Shinichi et al. ................. 714/15 |
| 6,523,133 | B2 | 2/2003 | Shin'ichi et al. ................ 714/15 |
| 7,114,067 | B2 | 9/2006 | Sukigara ........................... 713/2 |
| 2004/0039950 | A1* | 2/2004 | Okamoto et al. ............ 713/300 |
| 2008/0040599 | A1 | 2/2008 | Yoshida et al. ................... 713/2 |
| 2008/0133214 | A1* | 6/2008 | Leventhal et al. .............. 703/26 |

FOREIGN PATENT DOCUMENTS

| JP | 10-207588 | 8/1998 |
| JP | 2000-235484 | 8/2000 |
| JP | 2002-366504 | 12/2002 |
| JP | 2003-256216 | 9/2003 |
| JP | 2008-46672 | 2/2008 |

* cited by examiner

*Primary Examiner* — Saeid Ebrahimi Dehkordy
(74) *Attorney, Agent, or Firm* — Fitzpatrick, Cella, Harper & Scinto

(57) ABSTRACT

An information processing apparatus having multiple operating systems is disclosed. Among the multiple operating systems, a first operating system, the startup time of which is short, controls a particular device, and a second operating system, the startup time of which is longer than that of the first operating system, controls the emulated particular device.

4 Claims, 16 Drawing Sheets

FIG. 17

| FUNCTION | | FIRST OPERATING SYSTEM | SECOND OPERATING SYSTEM |
|---|---|---|---|
| COPY FUNCTION | | MAGNIFICATION: ONLY 100%<br>PAPER SELECTION: ONLY AUTO PAPER SELECTION<br>SORTING: ONLY GROUP (BY PAGE)<br>DOUBLE SIDED: DISABLED | MAGNIFICATION: 25% ~ 800%<br>PAPER SELECTION: AUTO PAPER SELECTION/ MANUAL SELECTION<br>SORTING: GROUP (BY PAGE) SORT (BY COPY)<br>DOUBLE SIDED: ENABLED |
| FAX FUNCTION | | DISABLED | ENABLED |
| PRINTER FUNCTION | | DISABLED | ENABLED |
| OTHER FUNCTION | | DISABLED | ENABLED |

INFORMATION PROCESSING APPARATUS AND CONTROL METHOD THEREOF

TECHNICAL FIELD

The present invention relates to an information processing apparatus and its control method for execution of processing under the control of an operating system.

BACKGROUND ART

An operating system (OS) installed in an information processing apparatus such as a personal computer (PC) provides general functions to application programs independently of the hardware configuration of the information processing apparatus. Especially, advanced operating systems, which can perform a part of the processing performed by application programs and can facilitate development of application program, are widely used.

On the other hand, since an operating system is independent of hardware configuration, it often performs redundant processing from the viewpoint of an information processing apparatus having a particular hardware configuration. Accordingly, it takes time for activation of the operating system.

For an information processing apparatus having a particular hardware configuration, a method for acceleration of operating system startup by optimization of operating system startup processing has been proposed.

Further, Japanese Patent Application Laid-Open No. 10-207588 discloses a so-called hibernation system in which a memory image immediately after operating system startup is stored in a memory device, and upon power on, the memory image is restored, thereby the startup is accelerated.

Further, Japanese Patent Application Laid-Open No. 2002-366504 discloses a system with a mode for high-speed operating system startup. In the high-speed OS startup mode, processing such as diagnosis of various hardware devices incorporated in the information processing apparatus are omitted.

However, the above-described conventional techniques have problems. The method of optimizing operating system startup processing in a particular information processing apparatus is applicable only to an information processing apparatus having a fixed hardware configuration. Otherwise, when the hardware configuration is changed, it is necessary to optimize the operating system startup processing in accordance with the changed hardware configuration.

Further, in the above-described hibernation system, it is necessary to store the memory image in the memory device. Especially in an information processing apparatus used by an unspecified number of users, some user may turn the power off or inadvertently pull the power plug without consideration of other users. Accordingly, at power on, the memory image immediately after the previous startup is not always stored in the memory device. When the memory device holds no memory image, the information processing apparatus cannot be started quickly. Further, even when a memory image is stored in the memory device, only the restoration of memory image is performed, but processing such as diagnosis of various hardware devices and a file system, which are performed upon activating operating system, is not performed. Accordingly, the system has a reliability problem.

Further, in the system with the high-speed OS startup mode, as in the case of the above-described hibernation system, processing such as diagnosis of various hardware devices and a file system, which are performed at activation of operating system, is not performed. Accordingly, the system also has a reliability problem.

DISCLOSURE OF INVENTION

An aspect of the present invention is to eliminate the above-mentioned problems of the conventional technology.

According to another aspect of the present invention, it is to improve user-friendliness by optimization of control of a particular device incorporated in an information processing apparatus by an operating system.

According to an aspect of the present invention, there is provided an information processing apparatus having first and second operating systems and a plurality of devices, comprising:

emulation means for emulating a particular device controlled by the first and second operating systems among the plurality of devices;

startup means for launching the first operating system and the second operating system startup time of which is longer than that of the first operating system; and management means for performing management such that the first operating system, launch of which by the startup means has been completed, controls the particular device until launch of the second operating system by the startup means is completed, and then the second operating system controls the particular device emulated by the emulation means.

According to an aspect of the present invention, there is provided a control method of controlling an information processing apparatus having first and second operating systems and a plurality of devices, the method comprising:

an emulation step of emulating a particular device controlled by the first and second operating systems among the plurality of devices;

a startup step of launching the first operating system and the second operating system startup time of which is longer than that of the first operating system; and a management step of performing such that the first operating system, launch of which has been completed, controls the particular device until launch of the second operating system is completed, and then the second operating system controls the particular device emulated in the emulation step.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 17 depicts a view illustrating contents of a table showing functions executable under the control of the first OS and functions executable under the control of the second OS in the information processing apparatus according to the embodiment.

BEST MODE FOR CARRYING OUT THE INVENTION

Preferred exemplary embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that an information processing apparatus according to the embodiments is a multifunction apparatus having various functions such as a copy function, a facsimile (FAX) function and a printer function. However, the present invention is not limited to the multifunction apparatus, but is applicable to a general information processing apparatus including a PC.

Figure 2:
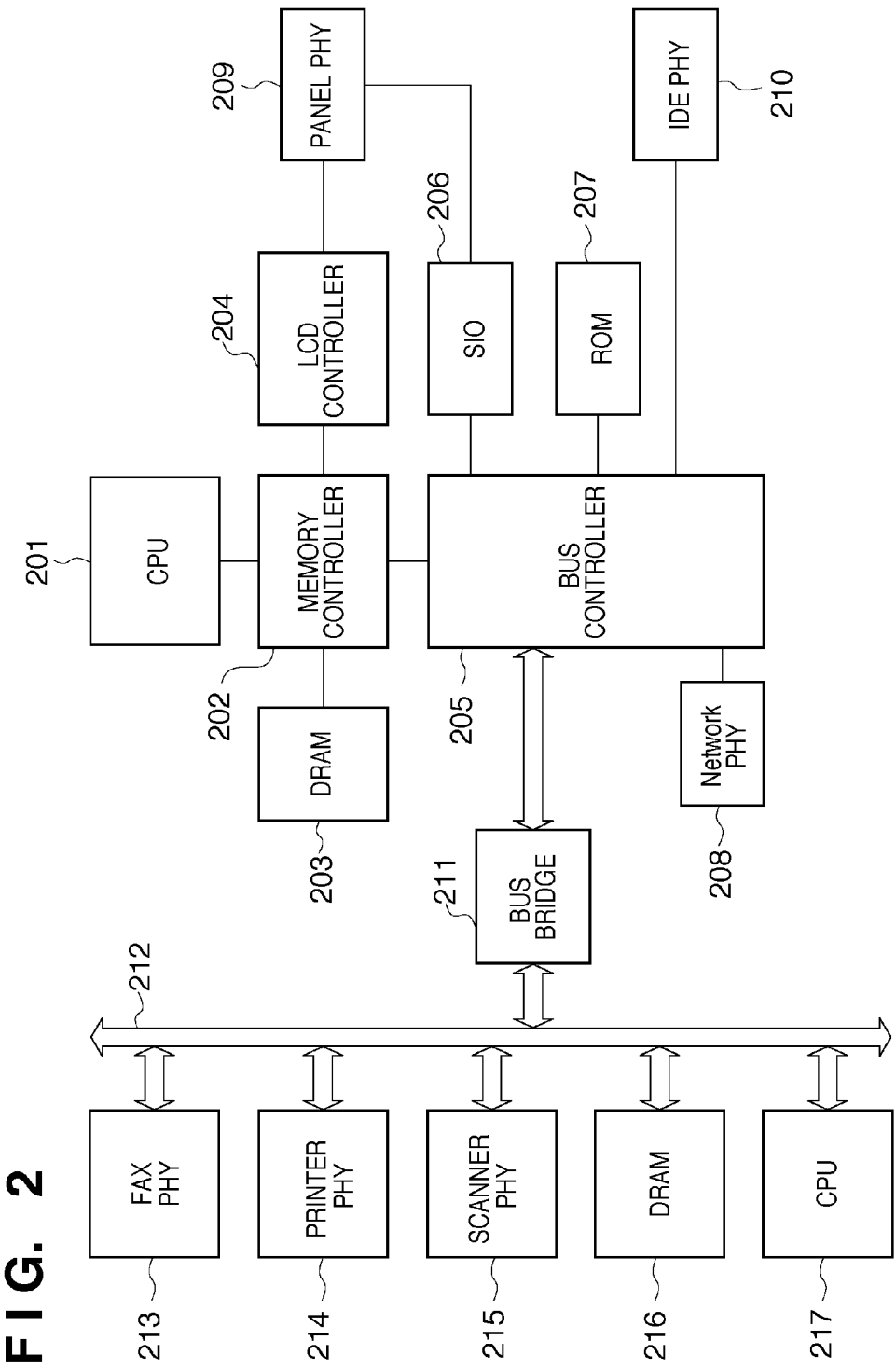
FIG. 2 is a block diagram showing the hardware configuration of the information processing apparatus according to the embodiment.

FIG. 2 is a block diagram showing the hardware configuration of an information processing apparatus according to the present embodiment.

<Hardware Configuration>

A CPU 201, connected to a memory controller 202, executes various programs stored in a DRAM 203 connected to the memory controller 202. The DRAM 203 holds various data such as operation data other than the programs. The memory controller 202 is further connected to an LCD controller 204 and a bus controller 205. The bus controller 205 is connected to an SIO 206 which is a serial communication controller and a ROM 207. Further, the bus controller 205 has a connector (IDE PHY) 210 for connection to a hard disk and a connector (Network PHY) 208 for connection to a network cable. Further, the bus controller 205 also operates as a hard disk controller and a network controller. The LCD controller 204 and the SIO 206 are connected to a panel PHY 209 to be connected to an operation panel 220 (FIG. 3) having an LCD panel (touch panel) for a user to operate the information processing apparatus. Note that the operation panel 220 will be described later. The ROM 207 holds set values for operation of the information processing apparatus and a boot program necessary for startup of the information processing apparatus, and the like.

The information processing apparatus further has another CPU 217. The CPU 217 is connected to a DRAM 216 and various hardware units (PHYs) 213 to 215 via a bus 212. The DRAM 216 holds various programs executed by the CPU 217 and various data. The bus 212 is connected to the bus controller 205 via a bus bridge 211. The various data stored in the DRAM 203 can be transferred to the DRAM 216 via the bus controller 205, the bus bridge 211 and the bus 212, and can also be transferred in the opposite direction. Further, the CPU 201 and the CPU 217 can mutually communicate with each other via the bus bridge 211. In this arrangement, the CPU 201 communicates with the CPU 217, thereby controls hardware devices connected to the various hardware units (PHYs) 213 to 215. Further, the CPU 201 can write a program executed by the CPU 217 from the hard disk connected to the connector (IDE PHY) 210 into the DRAM 216.

Next, the operation panel 220 connected to the panel PHY 209 will be described.

Figure 3:
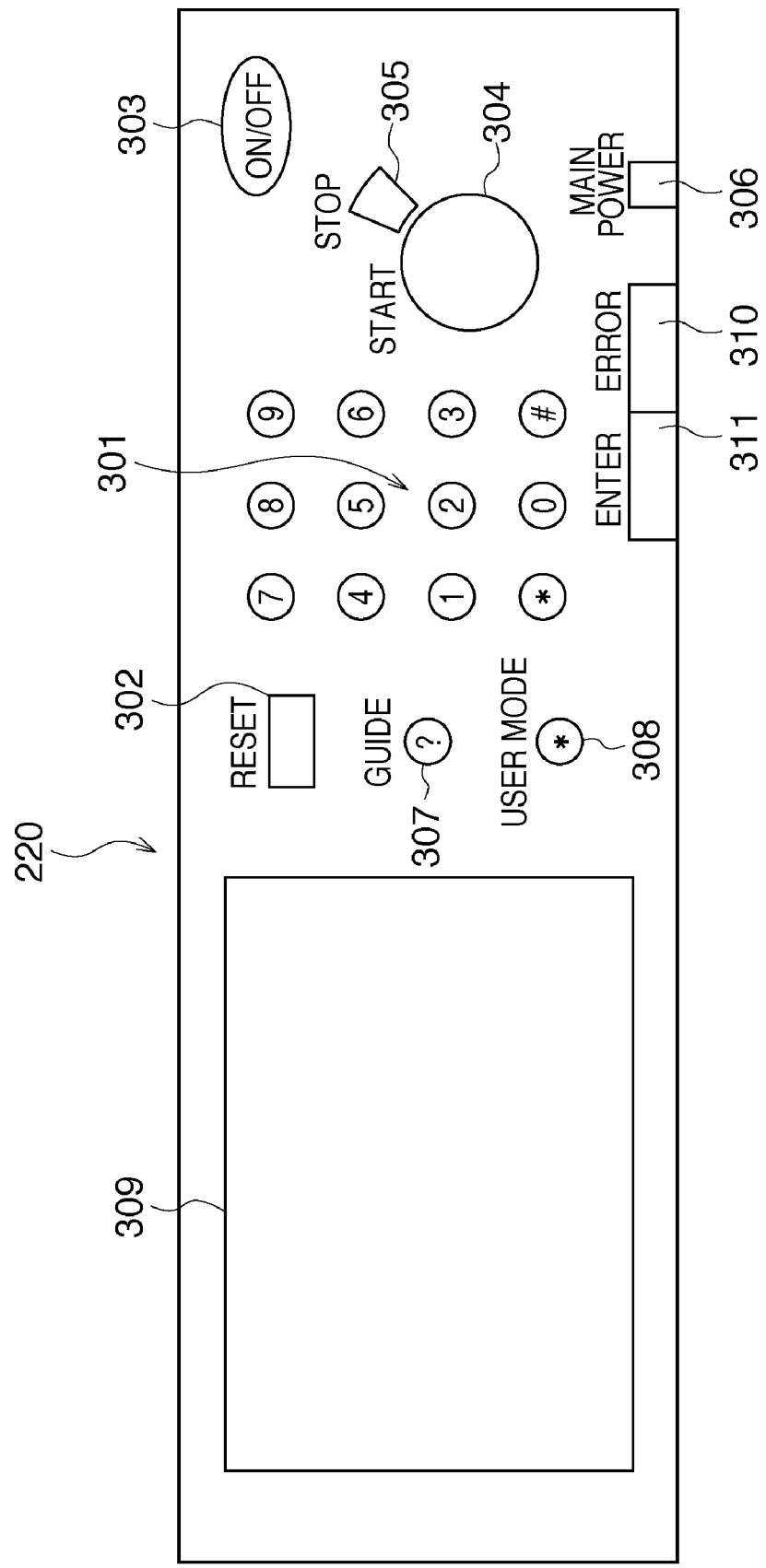
FIG. 3 depicts an outside view of an operation panel (console unit) of the information processing apparatus according to the embodiment.

FIG. 3 depicts an outside view of the operation panel (console unit) 220 of the information processing apparatus according to the embodiment.

Reference numeral 301 denotes ten keys for the user of the information processing apparatus to input numerical information, telephone numbers and the like. A reset key 302 is used clearing information set with the operation panel 220. A soft power key 303 is used for instructing the apparatus to turn ON/OFF in software. A start key 304 is used by the user for instructing the apparatus to start various functions such as FAX transfer and copying. A stop key 305 is used by the user for instructing the apparatus to stop execution of already-started various functions. An LED 306 indicates the power status of the information processing apparatus. An LED 310 indicates the status of a job executed in the information processing apparatus. Further, an LED 311 indicates an error status occurred in the information processing apparatus. These LEDs can be respectively set to "no light" status, "green light" status, "green flash" status or "orange light" status by serial communication using the SIO 206. A guide key 307 displays various instruction screens about the information processing apparatus. A user mode key 308 is used for setting of the information processing apparatus to a user mode. A touch panel 309 has a liquid crystal display. When the user operates the various keys on the operation panel 220 or the touch panel 309, the operation information is notified via the panel PHY 209 and the SIO 206 to the CPU 201. The CPU 201 controls the LCD controller 204 to produce or updates a display on the screen of the touch panel 309 in accordance with a program stored in the DRAM 203. Further, the CPU 201 controls the SIO 206 to turn on/off the various LEDs.

<Functions>

Next, the various functions of the information processing apparatus according to the present embodiment will be described by function.

(Copy Function)

The user sets an original on a scanner unit (not shown) connected to the scanner PHY 215, then operates the operation panel 220 to perform setting regarding copying. The setting regarding copying includes setting of the number of copies, an output sorting method, a reading magnification and the like. These set values are stored in the DRAM 203. Thereafter, the user depresses the start key 304. Then the CPU 201 detects the depression of the start key 304, and requests the CPU 217 to drive the scanner unit. At this time, information on the set value regarding the magnification and the destination of obtained image data is notified, with the request for driving, to the CPU 217. As the destination of image data from the scanner unit, one of the DRAM 203 and the DRAM 216 is selected. The CPU 217 drives the scanner unit via the scanner PHY 215 in accordance with the information received from the CPU 201.

At this time, the scanner unit forms image data by optically scanning the original set by the user. The image data read by the scanner unit is first stored in the DRAM 216, then subjected to predetermined image processing, then sent to the destination of image data designated by the CPU 201 (the DRAM 216 or the DRAM 203) and stored there. At this time, the CPU 201 may store the image data into the hard disk connected to the IDE PHY 210. Then the CPU 201 instructs the CPU 217 to print the obtained image data with a printer engine (not shown) connected to the printer PHY 214. The CPU 217 controls the printer engine via the printer PHY 214 to print the image data. The printer engine prints the image data on paper in accordance with the instruction from the CPU 217. Note that the print instruction to the printer engine is made on a per-page basis. When documents having multiple pages are set on the scanner unit, the CPU 201 instructs the CPU 217 to print image data multiple times. Further, when the user has designated a sorting method using the operation panel 220, the CPU 201 designates image data to be printed in accordance with the designated sorting method, thereby the sorting function is performed.

(FAX Function)

Next, the facsimile (FAX) transmission will be described. The user sets an original on the scanner unit connected to the scanner PHY 215. Then, the user operates the operation panel 220 to input a destination telephone number, settings upon reading and the like. When the user depresses the start key 304, the CPU 201 detects the depression of the start key 304, and requests the CPU 217 to read the original as in the case of the above-described copy function. Also in this case, the read image data is stored in the DRAM 203, the hard disk, or the DRAM 216. Next, the CPU 201 instructs the CPU 217 to send the stored image data by facsimile transmission to the designated telephone number using a facsimile unit (not shown) connected to the FAX PHY 213. The CPU 217 facsimile-transmits the image data designated by the CPU 201 to the designated telephone number by controlling the facsimile unit via the FAX PHY 213.

Next, the operation of facsimile reception will be described. The facsimile unit notifies the CPU 217 of facsimile reception, and transfers image data transmitted from the party on the other end to the DRAM 216 and stores the image data there. The CPU 217 notifies the CPU 201, with information on the received image data, of the facsimile reception. Thereafter, as in the case of the above-described copy function, the CPU 201 instructs the CPU 217 to output the received image data with the printer engine. Then the image data received with the facsimile unit is printed with the printer engine.

(Printer Function)

Document data generated by the user is transmitted via a network connected to the connector 208 to the information processing apparatus. The document data transmitted in this manner is, for example, PDL data. The document data received via the connector 208 is temporarily stored in the DRAM 203. The CPU 201 interprets the document data held in the DRAM 203 and converts the document data into image data, and stores the image data in the DRAM 203. Then the CPU 201 instructs the CPU 217 to output the image data with the printer engine as in the case of the above-described copy function. The CPU 217 controls the printer engine through the printer PHY 214 to print the image data.

(Other Function)

All the image data printed with the above-described copy function, the FAX function and the printer function may be stored in the hard disk connected to the IDE PHY 210. In this case, image data which has been once printed can be re-used. Further, when a plurality of items of image data are handled, image data held in the DRAM 203 is transferred to the hard disk, and in the DRAM 203, the image data transferred to the hard disk is deleted in the DRAM 203. In this arrangement, while image data is processed, other image data can be read or generated, accordingly, high-speed processing can be realized.

<Software Configuration>

Next, the configuration of software executed by the CPU 201 will be described using the drawings.

Figure 1:
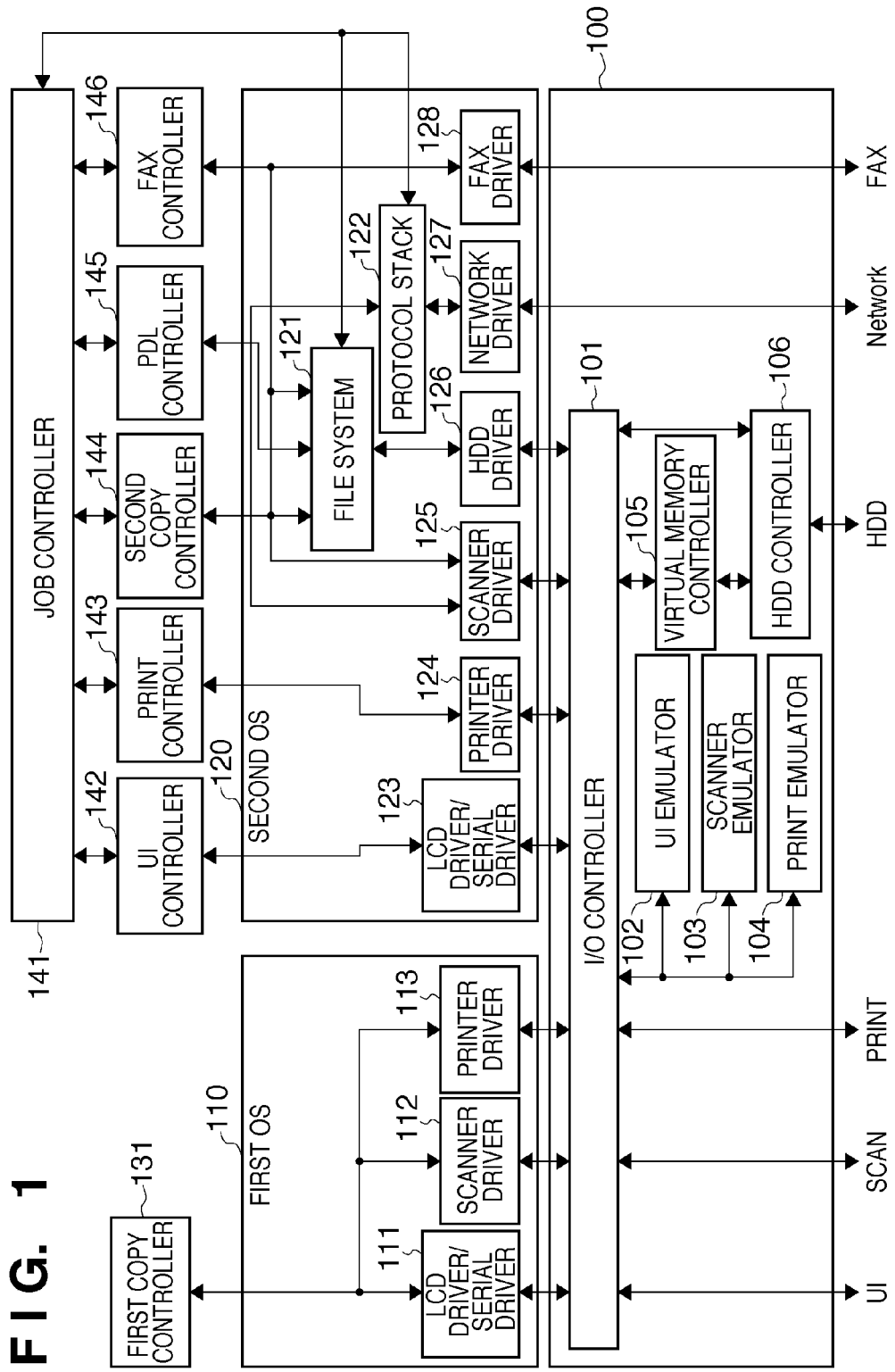
FIG. 1 is a block diagram showing the configuration of a software system executed by a CPU in an information processing apparatus according to an exemplary embodiment of the present invention.

FIG. 1 is a block diagram showing the configuration of a software system executed by the CPU 201 in the information processing apparatus according to the present embodiment.

Numeral 110 denotes a first operating system ("OS" hereinbelow). A first copy controller 131 to control the above-described copy operation operates on the first OS 110. The first copy controller 131 controls the operation panel 220, the scanner unit connected to the scanner PHY 215, and the printer engine connected to the printer PHY 214. These devices are controlled through device drivers 111 to 113 included in the first OS 110. The device drivers 111, 112 and 113 are an LCD serial driver, a scanner driver, and a printer driver.

A job controller 141 to control a job operates on a second OS 120. Further, a UI controller 142, a print controller 143, a second copy controller 144, a PDL controller 145 and a FAX controller 146 operate on the second OS 120. The UI controller 142 controls the operation panel 220. The print controller 143 controls the printer engine connected to the printer PHY 214. Further, the second copy controller 144 controls the above-described copy operation, and the PDL controller 145 controls the above-described printer function. Further, the FAX controller 146 controls the above-described FAX function. Note that the startup (activation) time of the first OS 110 is shorter than that of the second OS 120.

Further, the second OS 120 supports various file systems such as FAT and EXT 2. The file system is a system for storage or acquisition of files into/from a hard disk with high efficiency. A second application operating on the second OS 120 operates an API (Application Programming Interface) presented by the second OS 120 to utilize the file system. For example, the second copy controller 144 can efficiently store image data obtained from the scanner into the hard disk by operating the API. In this manner, by obtaining image data stored in the hard disk in an arbitrary order, printing on paper can be performed in various layouts (e.g., "printing in reverse order" and "N-up printing"). Further, the FAX controller 146 can store image data obtained by facsimile reception into the hard disk by operating the API. Then the facsimile-received image can be re-used. Further, the PDL controller 145 can efficiently store image data, obtained by interpretation of received image data, into the hard disk, by operating the API. Generally, image data generated in this manner cannot be deleted until it is outputted to the printer engine. Accordingly, when image data for a predetermined number of images has been generated, the PDL controller 145 interrupts interpretation processing until the image data is printed by the printer engine. However, as the number of images simultaneously stored in the hard disk is increased by storage of image data in the hard disk, the frequency of interruption of interpretation processing by the PDL controller 145 can be reduced. A file system 121 operates a hard disk driver 126 to control a hard disk controller included in the bus controller 205 to control the hard disk connected to the IDE PHY 210. Thus data transmission/reception to/from the hard disk (HDD) can be performed.

Further, the second OS 120 supports various network protocols such as TCP/IP and UDP. Generally, a network protocol supported by an OS is within the network layer in the OSI basic reference model. A protocol stack 122 presents an interface to applications operating on the second OS 120. These applications can communicate with an external information processing apparatus by various protocols by operating the interface. For example, the PDL controller 145 utilizes the interface to receive document data transmitted from the outside. Further, the job controller 141 utilizes the interface to communicate with the external information processing apparatus by SNMP (Simple Network Management Protocol). The protocol stack 122 performs communication with the external information processing apparatus connected via the connector 208 by operating the network driver 127 to control the network controller included in the bus controller 205. Further, the UI controller 142 displays an image on the touch panel 309 by operating a driver 123 to control the LCD controller 204 and the SIO 206. Further, the UI controller 142 receives a command inputted by the user's operation performed with respect to the operation panel 220, and performs screen update or instructs the job controller 141 to execute an operation desired by the user, in accordance with the user's instructions. Further, the print controller 143 prints various image data on paper by operating the printer driver 124 to control the printer engine connected to the printer PHY 214. Note that image data to be printed is designated by the job controller 141.

The second copy controller 144 operates a scanner driver 125 to control the scanner unit connected to the scanner PHY 215 in accordance with an instruction from the UI controller 142, to read an original set on the scanner unit and generate image data. Further, the second copy controller 144 writes the image data obtained in this manner into the hard disk by operating the file system 121. Further, the second copy controller 144 transmits the image data to the external information processing apparatus by operating the protocol stack 122. Further, the second copy controller 144 instructs the job controller 141 to print the image data. At this time, the job controller 141 designates the image data and instructs the print controller 143 to print the designated image data. Note that since the second copy controller 144 has stored the image data obtained by reading the original in the hard disk, printing can be performed in a sorting order according to an instruction from the UI controller 142 by controlling the order of the image data to be printed.

The PDL controller 145 interprets various received document data such as PDL data with the protocol stack 122 and converts the data into image data, then instructs the job controller 141 to print the image data. At this time, the job controller 141 designates the image data and instructs the print controller 143 to print the designated image data.

The FAX controller 146 operates in accordance with an instruction from the UI controller 142 or an incoming event issued from a FAX driver 128 to control the facsimile unit connected to the FAX PHY 213. When facsimile transmission has been instructed from the UI controller 142, the FAX controller 146 operates the scanner driver 125 to control the scanner unit connected to the scanner PHY 215 to read an original set on the scanner unit. Then the FAX controller 146 facsimile-transmits the read image data to a telephone number designated by the UI controller 142 by operating the FAX driver 128 to control the facsimile unit connected to the FAX PHY 213.

On the other hand, when an incoming event has been notified from the FAX driver 128, the FAX controller 146 reads the image data, and instructs the job controller 141 to print the image data. At this time, the job controller 141 designates the image data designated from the FAX controller 146 and instructs the print controller 143 to print the designated image data.

Note that the activation and execution of the first OS 110 and the second OS 120 are controlled by a hyper visor 100. The hyper visor 100 launches the first OS 110 and the second OS 120 in accordance with a method to be described later. Then the hyper visor 100 executes the first OS 110 and the second OS 120 in accordance with predetermined scheduling. The hyper visor 100 includes an I/O controller 101, emulators 102 to 104 to emulate at least a part of operations of the various devices, a virtual memory controller 105, and an HDD controller 106.

The device drivers 111 to 113 of the first OS 110 and the device drivers 123 to 128 of the second OS 120 access predetermined I/O space, and receive interrupt events which occur in the respective devices. The device drivers control the various devices in this manner. The access to I/O space or interrupt event from the devices is delivered to the respective OS's and the respective devices via the hyper visor 100. The I/O controller 101 of the hyper visor 100 conducts arbitration among the above-described accesses to I/O space and interrupts from the various devices, and records controls performed on the devices by the respective OS's.

Figure 4:
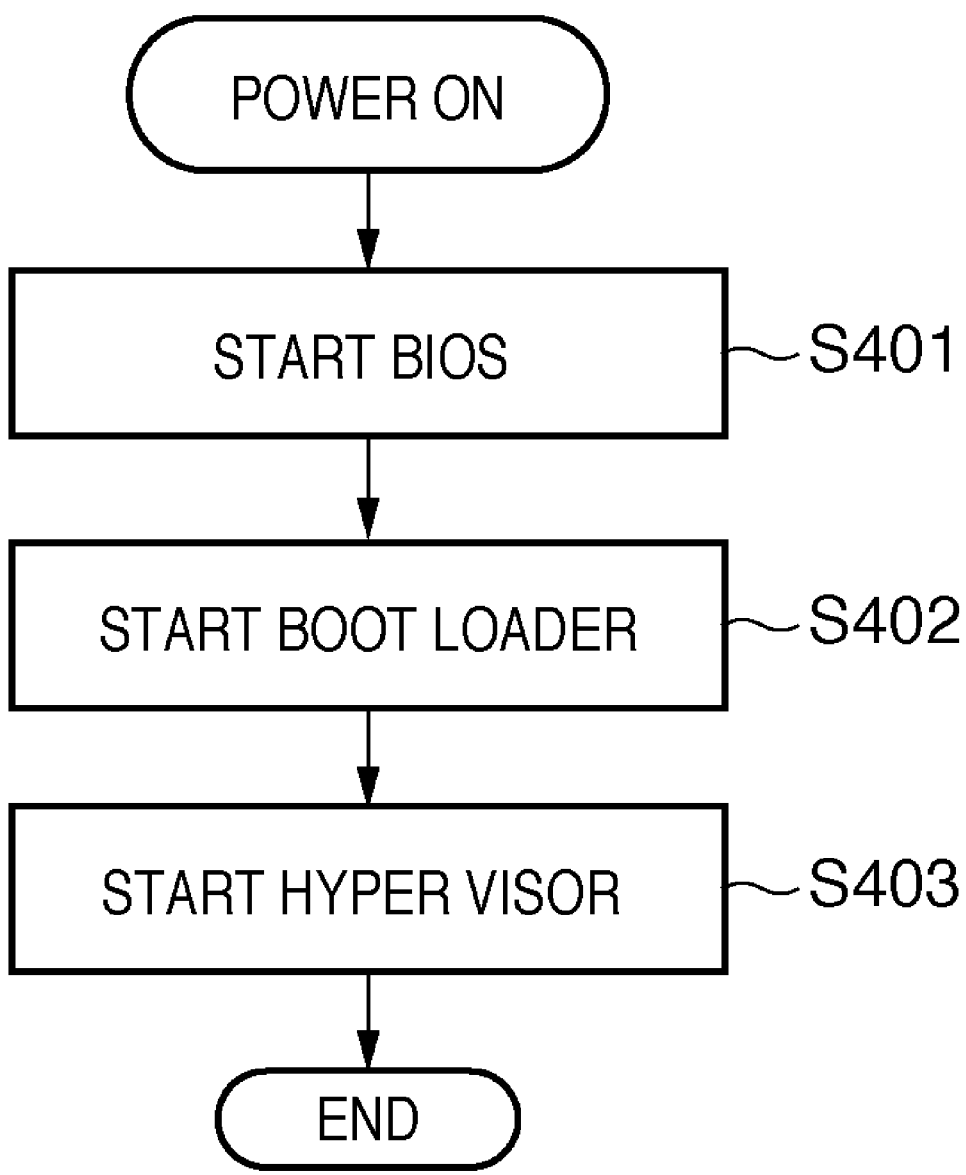
FIG. 4 is a flowchart showing processing after power on of the information processing apparatus according to the embodiment.

FIG. 4 is a flowchart showing processing after power on of the information processing apparatus according to the present embodiment.

When the power of the information processing apparatus is turned on, first, in step S401, a program called a "BIOS" stored in the ROM 207 is executed by the CPU 201. The BIOS initializes the memory controller 202 such that the CPU 201 can perform reading/writing from/into the DRAM 203. Next, the BIOS initializes the hard disk controller (not shown) included in the bus controller 205. Then the BIOS reads a bootstrap loader from a master boot record (MBR) of the hard disk connected to the IDE PHY 210 and develops it in the DRAM 203. Then in step S402, the BIOS executes the bootstrap loader loaded in the DRAM 203. The bootstrap loader inspects a partition table described in the MBR, and searches for a bootable partition. When a bootable partition is found, the bootstrap loader notifies the BIOS of the position of the partition to be booted, and loads the partition to the DRAM 203. In the present embodiment, the hyper visor is stored in the bootable partition. Next, in step S403, the bootstrap loader boots the hyper visor 100.

Figure 5:
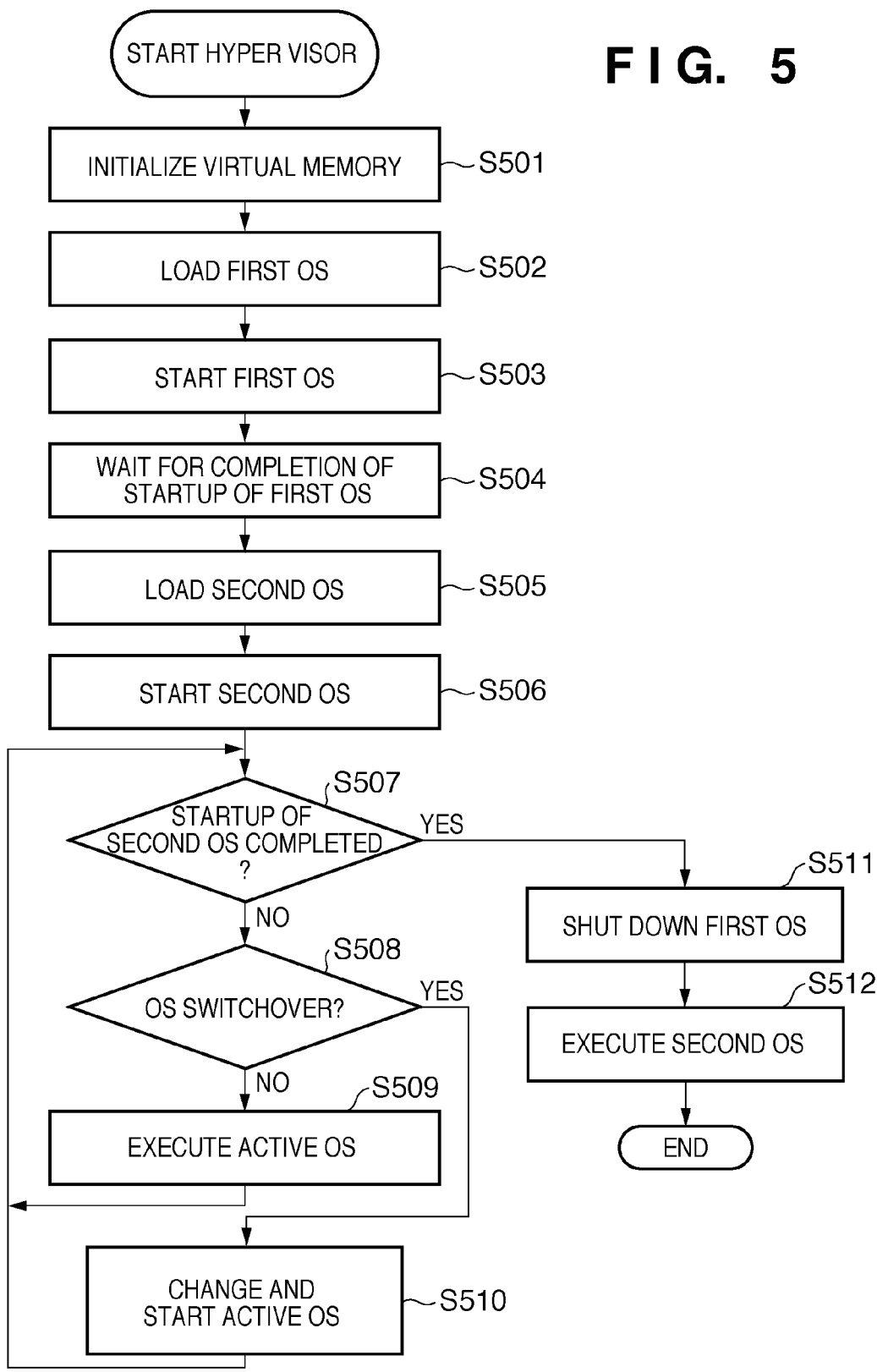
FIG. 5 is a flowchart showing the operation of a hyper visor in the information processing apparatus according to the embodiment.

FIG. 5 is a flowchart showing the operation of the hyper visor 100 in the information processing apparatus according to the present embodiment.

First, in step S501, the hyper visor 100 initializes a virtual memory. Next, in step S502, the hyper visor 100 loads the first OS 100, with the program of the first copy controller 131, from the hard disk to the DRAM 203. At this time, the hyper visor 100 defines a virtual memory space for the first OS 110. Note that the virtual memory space will be described later.

Next, in step S503, the hyper visor 100 launches the first OS 110 the startup time of which is short. Note that to launch the first OS 110, the hyper visor 100 controls the virtual memory controller 105 in accordance with the virtual memory space for the first OS 110, and thereafter, controls various registers of the CPU 201, to execute the program from the entry point of the first OS 110. Next, in step S504, the hyper visor 100 executes the first OS 110 until the information processing apparatus becomes user-operable with the first OS 110. The hyper visor 100 monitors an access to a device from the first OS 110, thereby determines whether or not the information processing apparatus has become user-operable. At this time, the I/O controller 101 performs control such that the access to the I/O space by the first OS 110 is performed on an actual device and an event from the actual device is transmitted to the first OS 110. That is, the I/O controller 101 accesses the I/O space which the first OS 110 has tried to access. Further, the I/O controller 101 calls a subroutine described in an interrupt vector prepared by the first OS 110 corresponding to the interrupt event received from the device.

When the information processing apparatus has become user-operable with the first OS 110, the process proceeds to step S505, at which the hyper visor 100 loads the second OS 120, the startup time of which is longer than that of the first OS 110, from the hard disk to the DRAM 203. At this time, as in the case of the above-described first OS 110, the hyper visor 100 defines virtual memory space for the second OS 120. Next, in step S506, the hyper visor 100 executes the second OS 120. To execute the second OS 120, the hyper visor 100 makes the first OS 110 and the second OS 120 executable in parallel by a predetermined scheduling method. At this time, the I/O controller 101 performs control such that device control by the first OS 110 is performed on an actual device by a method to be described later. Further, the I/O controller 101 performs control such that device control by the second OS 120 on a device controlled by the first OS 110 is performed via the respective device emulators 102 to 104. Further, the I/O controller 101 performs control, such that an event from the actual device is transmitted to the first OS 110, and an event issued by the various device emulators 102 to 104 is transmitted to the second OS 120. That is, when the device driver of the second OS 120 tries to access the I/O space, the various device emulators 102 to 104 are notified of the address to be accessed and the access method (reading or writing). Upon writing, the various device emulators 102 to 104 corresponding to the address to be accessed are notified of the data to be written and the bit length of the data. The device emulators 102 to 104 emulate the respective devices. For example, a device emulator which emulates a device in which its open register value is changed in accordance with an access has a memory to emulate the register. The device emulator rewrites the memory to emulate the register in accordance with notified information. Thereafter, when the device emulator is notified of access to read the register value, the device emulator notifies the I/O controller 101 of the content of the memory. The I/O controller 101 notifies the second OS 120 of the notified memory content. Further, regarding a device emulator which emulates a device in which an interrupt occurs in accordance with the above-described access, the hyper visor 100 calls a subroutine described in an interrupt vector prepared by the second OS 120. Then the device emulator emulates an interrupt event issued by the device.

Next, in step S507, the hyper visor 100 monitors device control executed by the second OS 120, thereby determines whether or not the information processing apparatus has become logically user-operable with the second OS 120. When it is determined that the information processing apparatus is not operable, the process proceeds to step S508, in which it is determined whether or not OS switchover is to be performed. When it is determined that the OS switchover is not to be performed, the process proceeds to step S509, at which the hyper visor 100 continuously executes the previously-executed OS. On the other hand, when it is determined in step S508 that the OS switchover is to be performed, the process proceeds to step S510, in which the hyper visor 100 controls the virtual memory controller 105 in accordance with the virtual memory spaces for the respective OS's, then controls the various registers of the CPU 201 and changes the OS to another OS to be executed.

On the other hand, when it is determined in step S507 that the startup of the second OS 120 has been completed and the information processing apparatus has become user-operable, the process proceeds to step S511, in which the hyper visor 100 performs shutdown processing on the first OS 110. The details of this processing will be described later. When the shutdown processing of the first OS 110 has been completed, the process proceeds to step S512, in which the hyper visor 100 changes the scheduling method such that only the second OS 120 is executed. At this time, the I/O controller 101 performs control such that access to the I/O space by the second OS 120 is performed on an actual device, and an event from the actual device is transmitted to the second OS 120. For example, the I/O controller 101 performs control such that after the completion of shutdown processing of the first OS 110, the I/O controller 101 accesses the I/O space to which the second OS 120 has attempted access. Further, the I/O controller 101 calls a subroutine described in an interrupt vector prepared by the second OS 120 corresponding to the interrupt event received from the device.

Next, the virtual memory space will be described with reference to FIG. 7.

Figure 7:
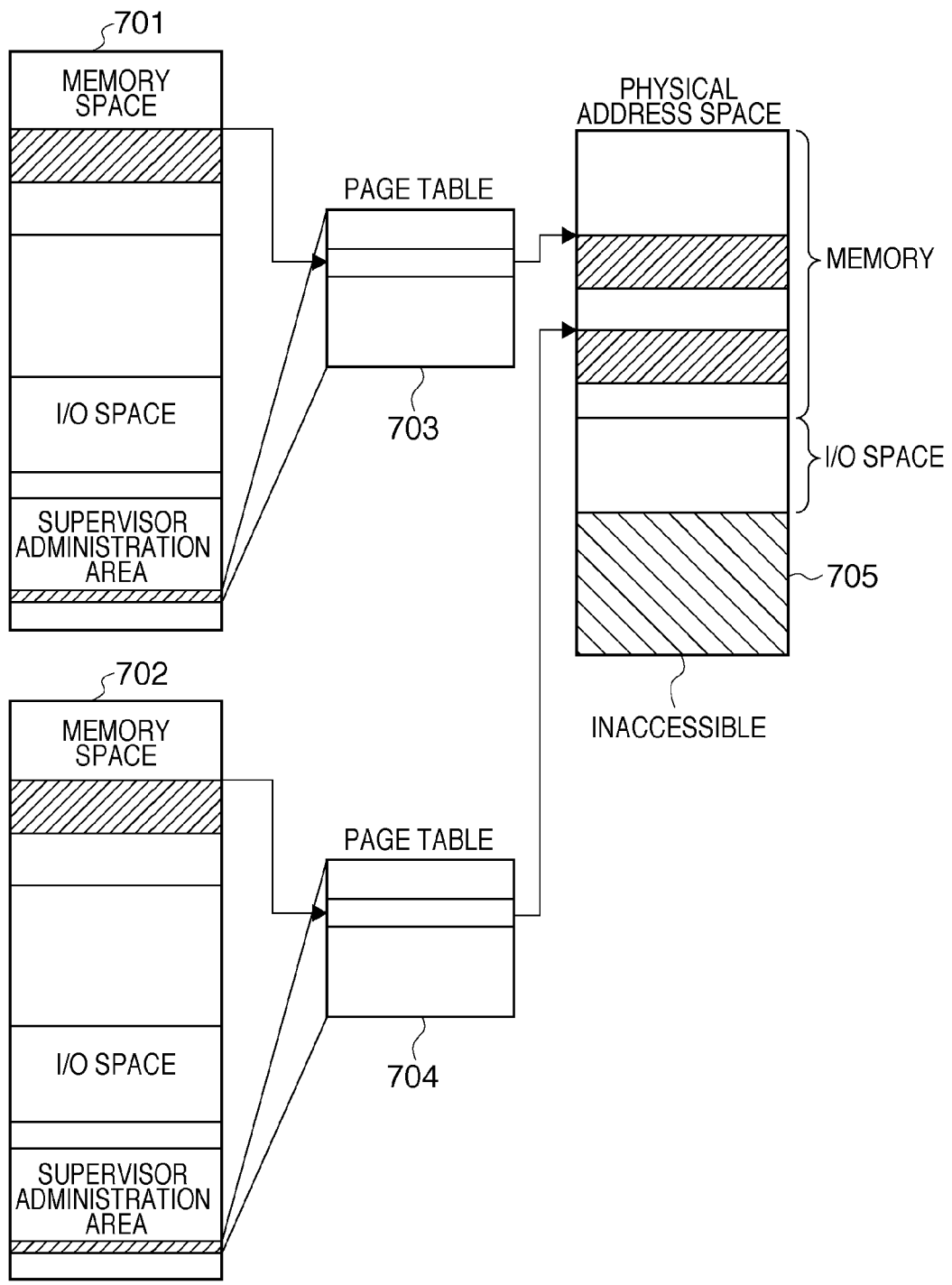
FIG. 7 depicts an explanatory view of a virtual memory space (virtual memory address space) in the information processing apparatus according to the embodiment.

FIG. 7 depicts an explanatory view of the virtual memory space (virtual memory address space) in the information processing apparatus according to the present embodiment.

The virtual memory space has logically-accessible addresses defined by an application to which the virtual memory space is allocated. Numerals 701 and 702 denote virtual memory spaces. In the virtual memory space, the I/O space is allocated to predetermined addresses in correspondence with the information processing apparatus. Numerals 703 and 704 denote page tables describing allocation of the logical addresses of the respective virtual memory spaces to actual memory areas. The page tables 703 and 704 respectively have flags each indicating whether or not each memory address is valid. Numeral 705 denotes physical address space of the information processing apparatus. Note that as the I/O space is not allocated to the actual memory area, it is not described in the page tables 703 and 704.

During access to each virtual memory space, if the accessed address is not described in the page tables 703 and 704 or the described actual memory is not valid, an interrupt called an "exception" occurs in the CPU 201. The exception occurring in the CPU 201 is transferred to the hyper visor 100, and page swapping and/or I/O processing to be described later is performed.

Next, the operation of the I/O controller 101 will be described with reference to the flowchart of FIG. 6.

Figure 6:
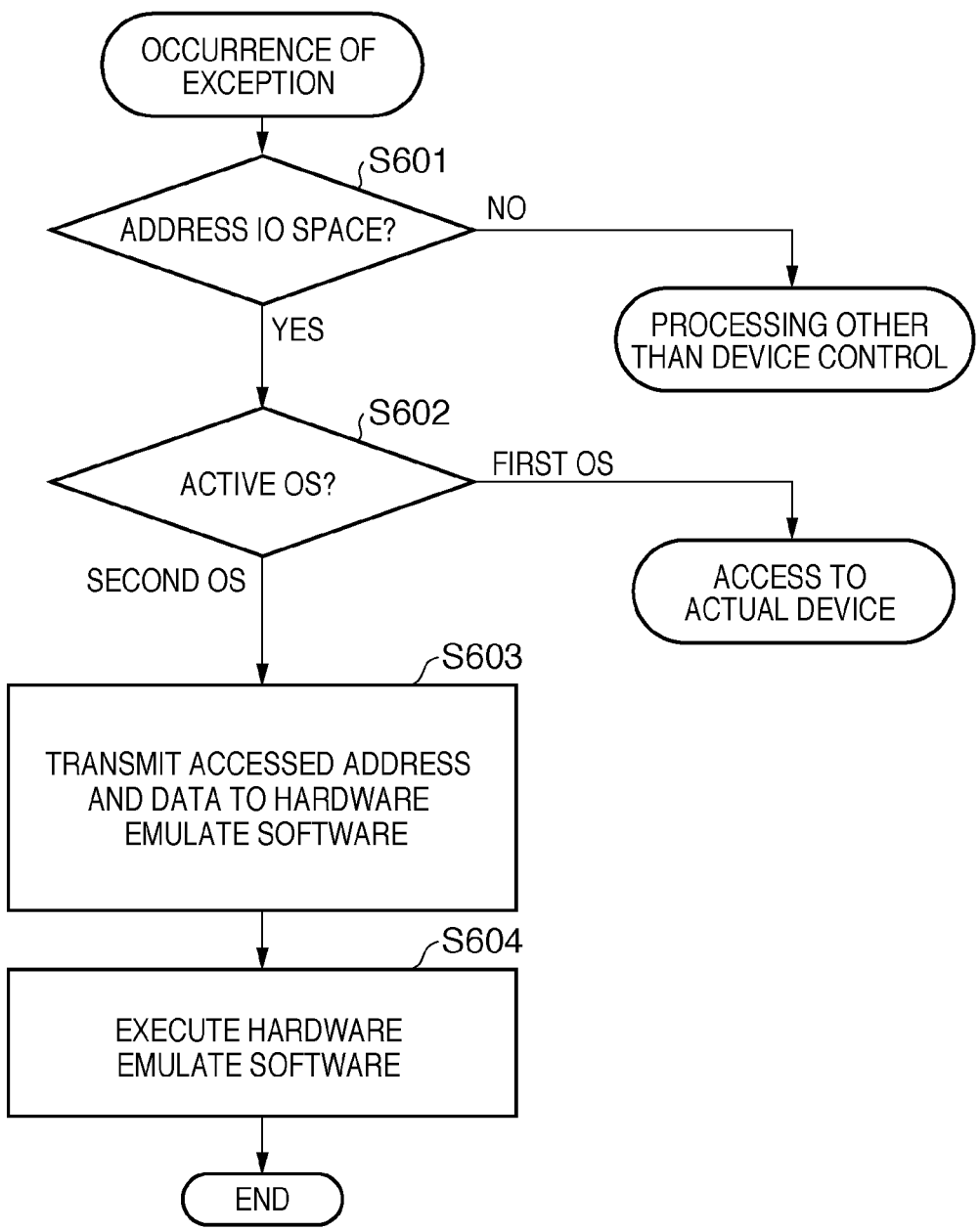
FIG. 6 is a flowchart showing an example of I/O processing in the information processing apparatus according to the embodiment.

FIG. 6 is a flowchart showing an example of the I/O processing in the information processing apparatus according to the present embodiment.

When the respective device drivers of the respective OS's access predetermined I/O space, an exception interrupt occurs in the CPU 201. The hyper visor 100 is notified of the exception interrupt occurring in the CPU 201. In step S601, the hyper visor 100 inspects an address to which the device driver has attempted access, and determines whether or not the access is to control the device. When it is determined that the address is not allocated to the I/O space, the hyper visor 100 performs processing with the device as an out-of-control event. On the other hand, when it is determined in step S601 that the accessed address is allocated to the I/O space, the process proceeds to step S602, in which it is determined whether the OS executed by the hyper visor 100 is the first OS or the second OS. When it is determined that the OS accessed the I/O space is the first OS 110, the I/O controller 101 accesses the designated I/O space. Note that when the hyper visor 100 accesses the I/O space, as a privilege mode of the CPU 201 is set before the access, an exception interrupt will not occur.

On the other hand, when it is determined that the OS that accessed the I/O space is the second OS 120, the process proceeds to step S603. Then the accessed address and, if the access is a write, the value itself, are stored in the memory. Then in step S604, emulation software for an appropriate device is executed in accordance with the stored address.

Note that as in the case of an actual device, the emulation software rewrites an emulated register and emulates an interrupt. Accordingly, the second OS 120 can perform initialization processing even while an actual device is operated by the first OS 110.

Next, the operation of the first OS 110 will be described using the flowchart of FIG. 8.

Figure 8:
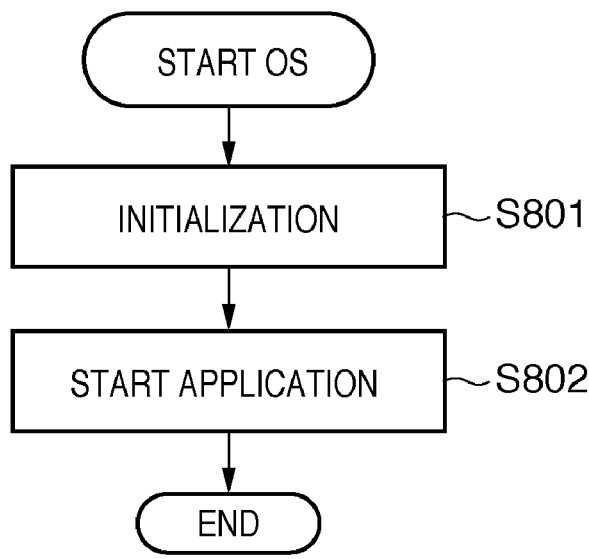
FIG. 8 is a flowchart showing an example of OS startup processing in the information processing apparatus according to the embodiment.

FIG. 8 is a flowchart showing an example of OS startup processing in the information processing apparatus according to the present embodiment.

This processing is started by activation of the OS. First, in step S801, the first OS 110 initializes the OS itself. Next, in step S802, the first OS 110 starts the first copy controller 131.

Next, the operation of the first copy controller 131 will be described using the flowchart of] FIG. 9.

Figure 9:
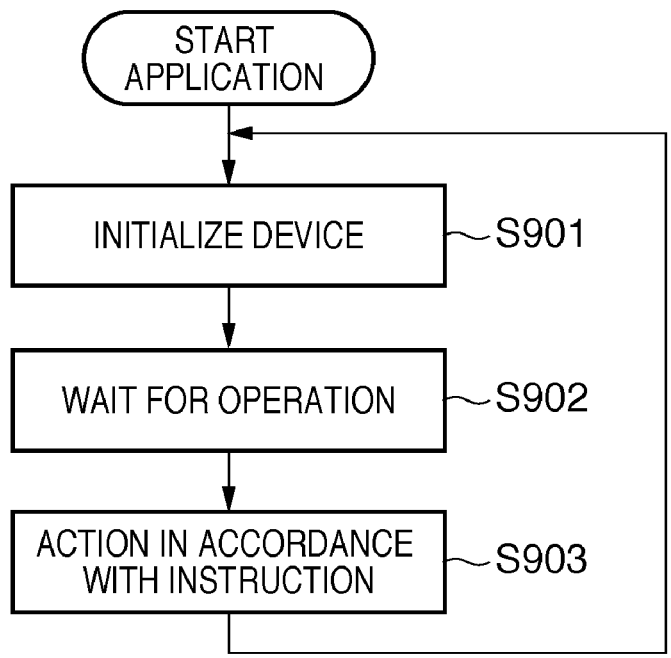
FIG. 9 is a flowchart showing an example of the operation of an application operating on the OS in the information processing apparatus according to the embodiment.

FIG. 9 is a flowchart showing an example of the operation of an application operating on the OS in the information processing apparatus according to the present embodiment.

This processing is started by activation of the application. First, in step S901, the first copy controller 131 operates the various device drivers to perform initialization processing. In this example, the scanner unit connected to the scanner PHY 215, the printer engine connected to the printer PHY 214 and the operation panel 220 connected to the panel PHY 209 are initialized. At this time, the first copy controller 131 controls the LED 306 on the operation panel 220 to the "green flash" status. Further, it may be arranged such that a message indicating that the information processing apparatus is being initialized is displayed on the touch panel 309. When the device initialization has been completed and the copy operation has become possible, the process proceeds to step S902, in which the first copy controller 131 updates the screen of the touch panel 309, and controls the LED 306 to enter the "green light" status. At this time, the information processing apparatus may accept user operations. When the user operates the touch panel 309, the process proceeds to step S903, in which the first copy controller 131 updates the screen of the touch panel 309 in accordance with the operation. Then, when the user depresses the start key 304, the first copy controller 131 starts the copy operation in accordance with the values set by that time.

Figure 13:
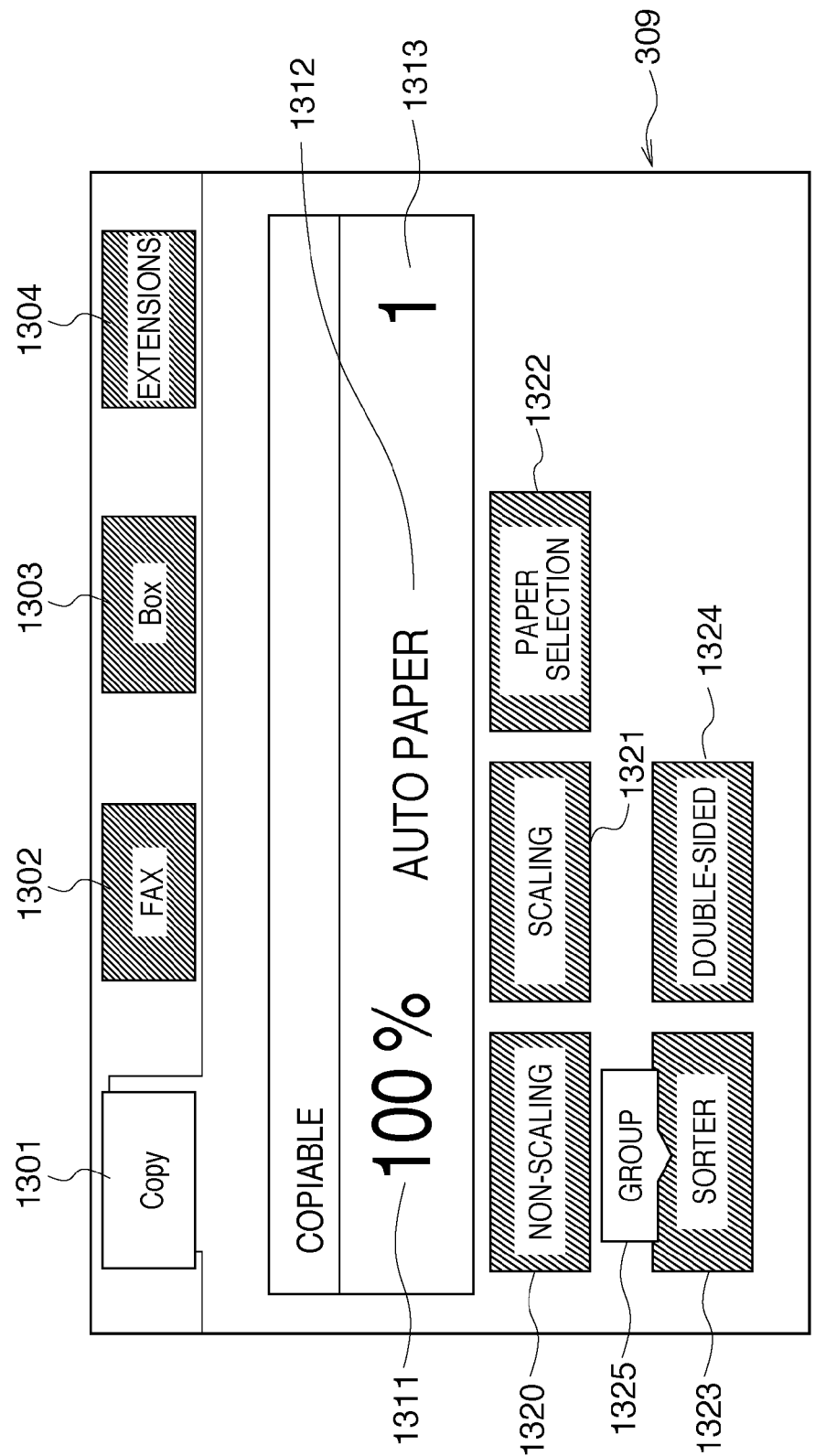
FIG. 13 depicts a view illustrating an example of a touch panel (user interface) in the information processing apparatus according to the present embodiment.

FIG. 13 depicts a view illustrating an example of a display of the touch panel 309 (user interface) in the information processing apparatus according to the present embodiment.

Numerals 1302 to 1304 and 1320 to 1324 denote grayed out software keys. Even when the user depresses one of these grayed out keys, the operation is ignored. Further, the instruction to a copy key 1301 is also ignored (no reaction occurs in response to the operation of the touch panel 309). These keys are used only for design compatibility with the user interface displayed by the UI controller 142 operating on the second OS 120 to be described later.

Numeral 1311 denotes a character string indicating the percentage of an output image to the original read by the scanner unit. In this example, "100%" indicating non-scaled output is displayed. Numeral 1312 denotes a character string indicating the type of paper on which printing is performed. In this example, "auto paper" to determine a paper size in correspondence with the size of the original is set. Note that in the user interface displayed by the first copy controller 131, the contents of the percentage display 1311 and the paper type 312 cannot be changed. Numeral 1313 denotes a character string indicating the set number of copies. The user can change the number of copies by operating the ten keys 301 on the operation panel 220.

When any of the ten keys 301 on the operation panel 220 have been depressed, the first copy controller 131 updates the screen drawn on the touch panel 309 in accordance with the depressed key. Numeral 1325 denotes a display indicating a current sorting method when output of multiple copies is set. In the user interface displayed by the first copy controller 131, as the setting of the sorting cannot be made, group sort is always selected. Note that the sorting is prohibited by the first copy controller 131 since the hard disk cannot be used in the first OS 110. That is, to perform sorting by copy upon output, it is necessary to scan all the document data and store image data for all the document data in the hard disk by the completion of printing. However, the storage in the hard disk is disabled in the first OS 110.

Under the above-described settings, when the user depresses the start key 304 on the operation panel 220, the first copy controller 131 operates the scanner driver 112 and instructs the scanner unit to start reading of a set original. At this time, the first copy controller 131 instructs to transfer image data for 1 page read by the scanner unit to the DRAM 216 and store the data there, since it is not necessary for the first copy controller 131 to store the data read by the scanner unit in the HDD, and only group sorting is performed. At the same time, the first copy controller 131 operates the LCD serial driver 111 to set the execution LED 310 on the operation panel 220 to the "green flash" status.

When the image data for 1 page read by the scanner unit has been stored in the DRAM 216, the first copy controller 131 operates the printer driver 113 to print the image data stored in the DRAM 216. These operations are repeated by the set number of copies. When the printing for the necessary number of copies has been completed, the first copy controller 131 deletes the image data stored in the DRAM 216, and controls the scanner unit to start reading of the next page. The above-described processing is repeated, and when all the printing has been completed, the first copy controller 131 turns the execution LED 310 off. Note that it may be arranged such that as long as there is an available capacity in the DRAM 216, the first copy controller 131 continuously controls the scanner unit to perform original reading.

Next, the shutdown processing of the first OS 110 at step S511 in the flowchart of FIG. 5 will be described in detail with reference to the flowchart of FIG. 10.

Figure 10:
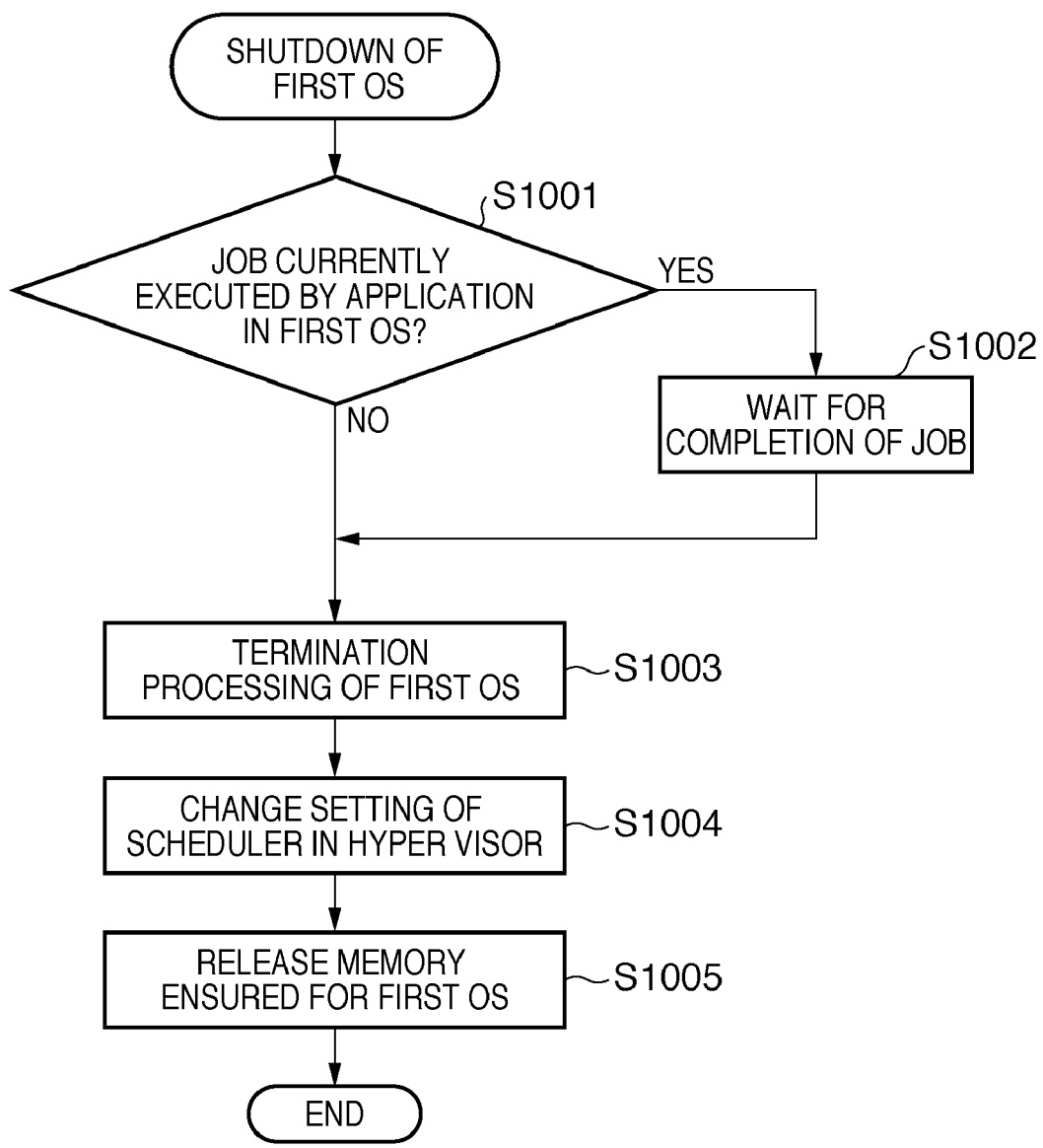
FIG. 10 is a flowchart showing an example of shutdown processing of a first OS in the information processing apparatus according to the embodiment.

FIG. 10 is a flowchart showing an example of the shutdown processing of the first OS 110 in the information processing apparatus according to the present embodiment.

First, in step S1001, the hyper visor 100 determines whether or not an application on the first OS 110 is executing a job. As the I/O controller 101 can store inputs from the operation panel 220 by the user and operations of the LEDs and the like on the operation panel 220 by the first OS 110, the hyper visor 100 determines whether or not a job is executed on the first OS 110 by utilizing the stored contents. When it is determined that a job is executed on the first OS 110, the process proceeds to step S1002, in which point the hyper visor awaits completion of the job executed on the first OS 110.

When it is determined in step S1001 that no job is processed by the first OS 110 or when the job is not executed in step S1002, the process proceeds to step S1003, in which the hyper visor 100 performs control to shutdown the first OS 110. For example, an event upon depression of the power key 303 on the operation panel 220 may be emulated by the I/O controller 101 and transferred to the first OS 110. When the shutdown processing of the first OS 110 has been competed, the process proceeds to step S1004, in which the hyper visor 100 performs control to change the setting of the scheduler not to execute the first OS 110. Next, in step S1005, the hyper visor 100 releases the memory area ensured for the first OS 110, thereby completes shutdown processing of the first OS 110. The memory area ensured for the first OS 110 is the page table of the virtual memory space for the first OS 110 defined in step S502 in FIG. 5 and the memory in which the first OS 110 itself is loaded. Note that it may be arranged such that in step S1003, as shown in FIG. 14, the first OS 110 displays a message indicating that the information processing apparatus is not user-operable on the touch panel 309.

Figure 14:
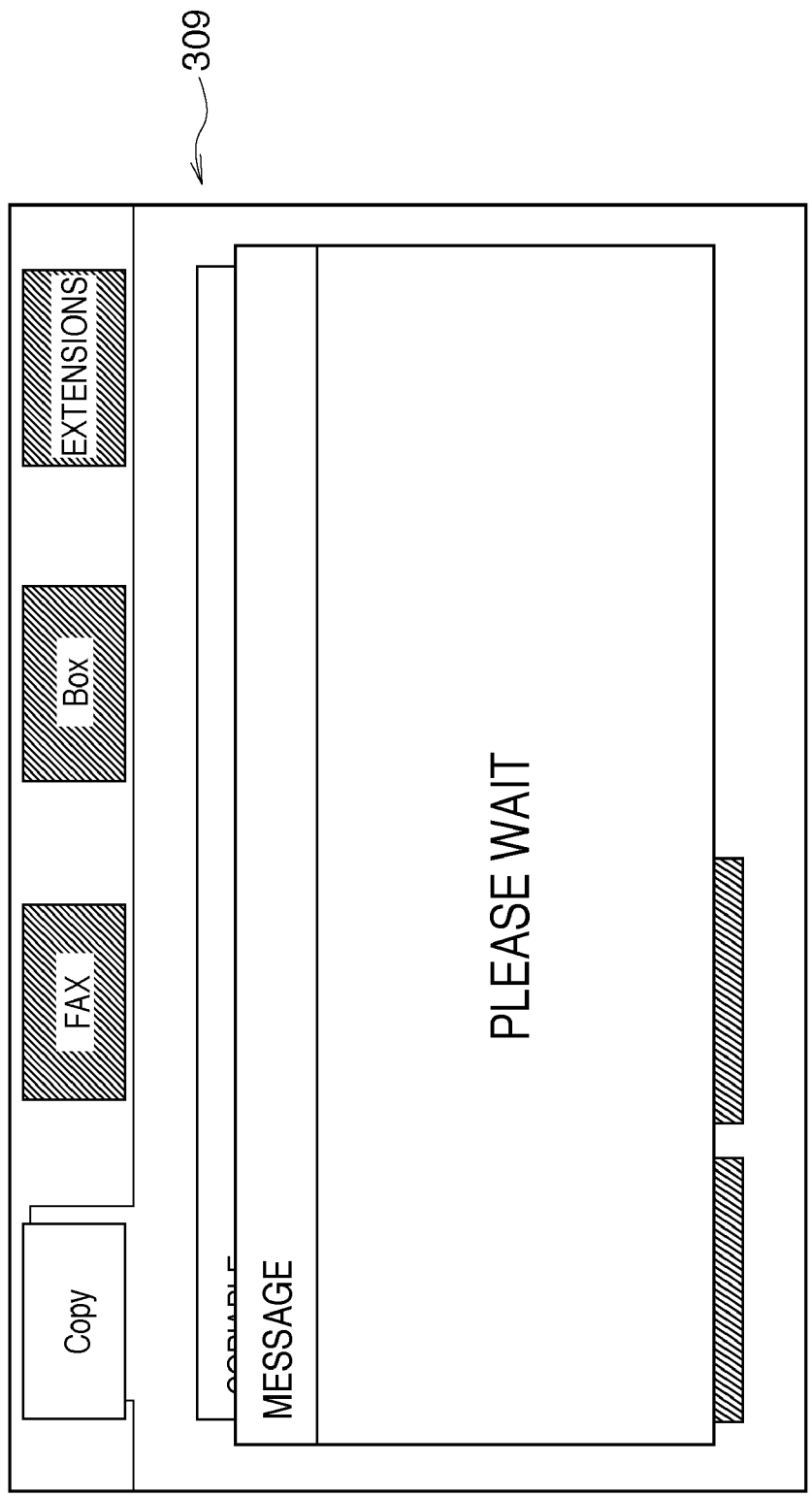
FIG. 14 depicts a view illustrating an example of the user interface in the information processing apparatus according to the present embodiment.

FIG. 14 depicts a vie illustrating an example of a display of the user interface in the information processing apparatus according to the present embodiment.

In FIG. 14, a user is notified of the inoperable status of the information processing apparatus by display of a message "please wait".

Figure 11:
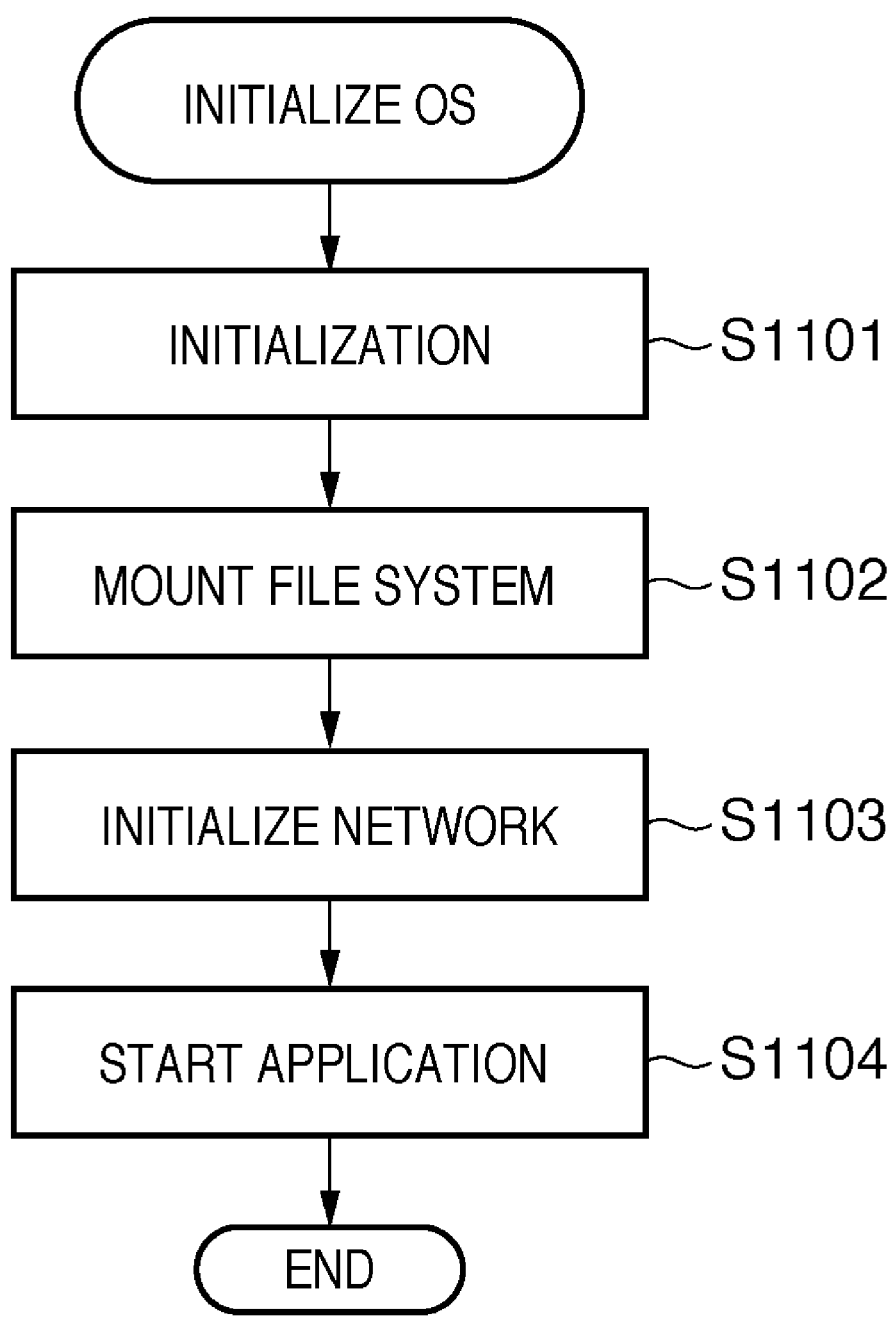
FIG. 11 is a flowchart showing an example of startup processing of a second OS in the information processing apparatus according the embodiment.

Next, the operation of the second OS 120 will be described using the flowchart of FIG. 11. FIG. 11 is a flowchart showing an example of activation processing of the second OS 120 in the information processing apparatus according the present embodiment.

First, in step S1101, the second OS 120 initializes the OS itself. Next, in step S1102, the second OS 120 performs mount processing on the file system utilized by the second OS 120. By the mount processing, management information on the file system is read in the memory, and initialization of a file management table and the like are performed, such that the OS can use the file system. At this time, the second OS 120 may execute a program to check the mounted file system. Next, in step S1103, the second OS 120 performs network initialization. At this time, the second OS 120 may perform negotiation processing and the like necessary for communication with an external server by DHCP or the like. Next, in step S1104, the second OS 120 starts the various applications operating on the second OS 120. Note that after the completion of startup of the applications, the shutdown processing of the fist OS 110 described in FIG. 10 is started.

Figure 15:
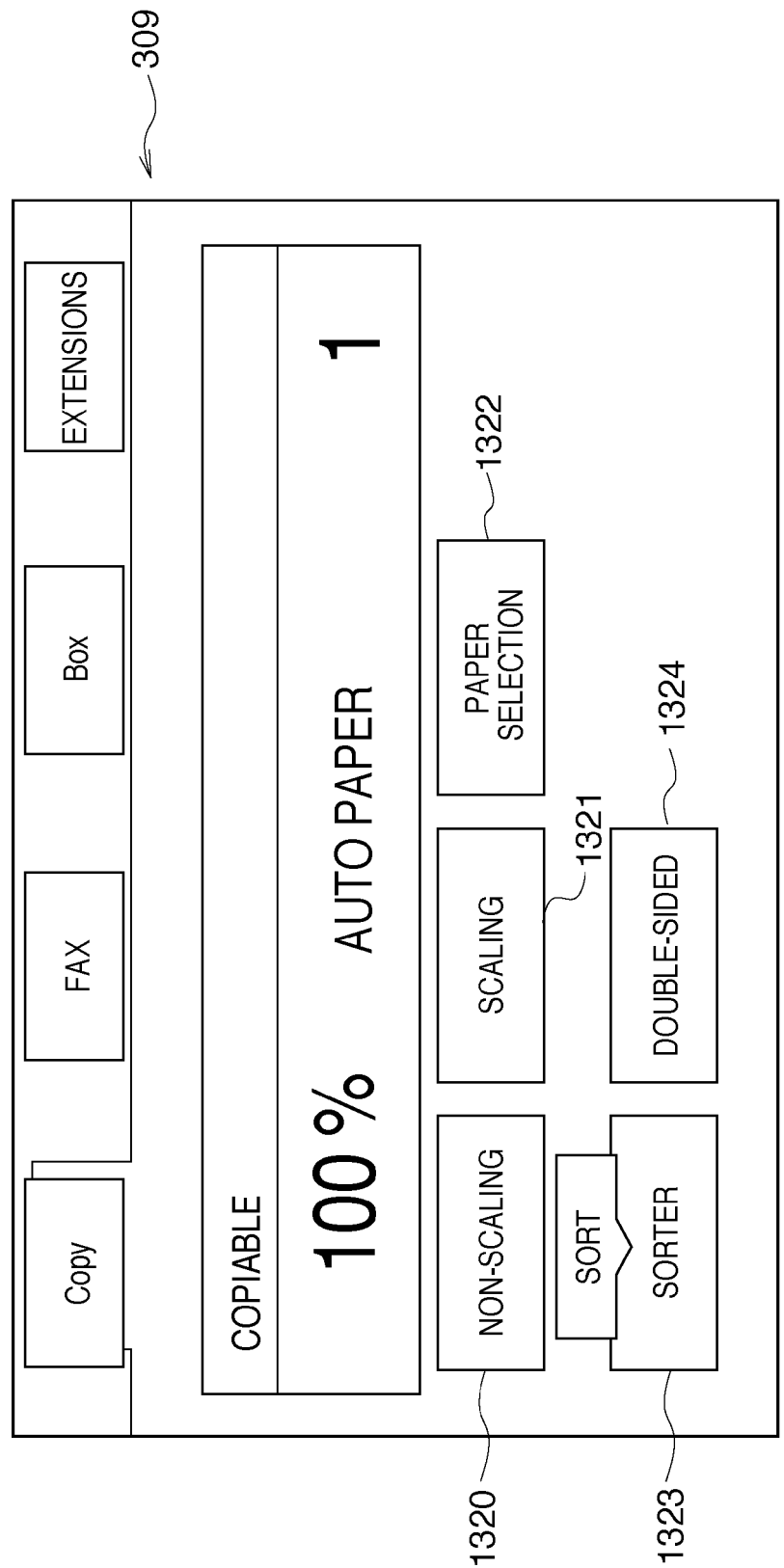
FIG. 15 depicts a view illustrating an example of the user interface in the information processing apparatus according to the present embodiment.

FIG. 15 depicts a view illustrating an example of a display of the user interface in the information processing apparatus according to the present embodiment.

FIG. 15 shows an example of the user interface displayed on the touch panel 309 by the UI controller 142 operating on the second OS 120. In FIG. 15, the keys which are grayed out in FIG. 13 are not grayed out. For example, the non-scaling key 1320 and the scaling key 1321 are used for changing the percentage of an output image size to an original size. When the non-scaling key 1320 is depressed, the value is 100%. When the scaling key 1321 is depressed, a screen to set the percentage as shown in FIG. 16 is displayed on the touch panel 309.

Figure 16:
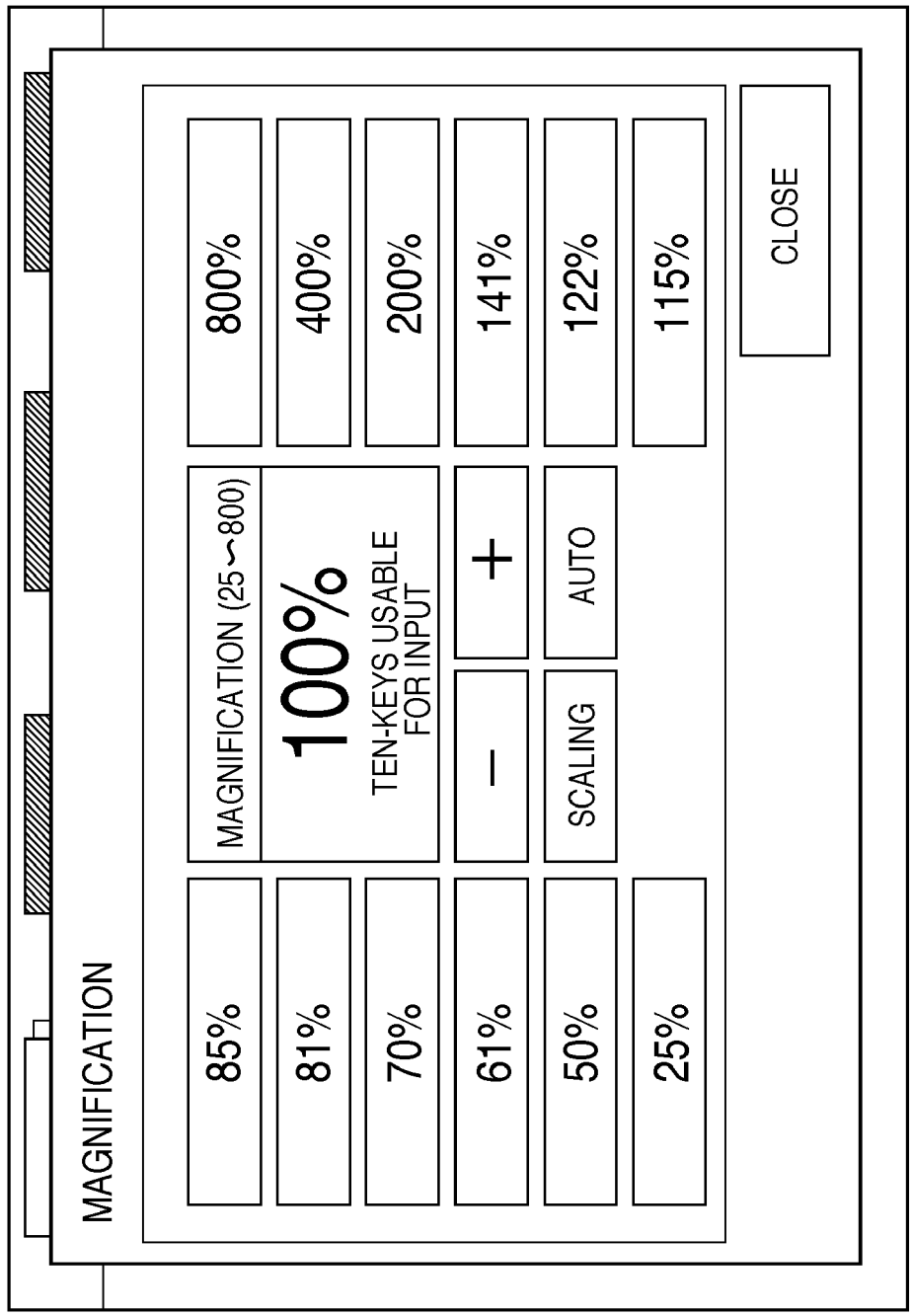
FIG. 16 depicts a view illustrating an example of a magnification setting screen displayed upon depression of a scaling key in the information processing apparatus according to the embodiment.

FIG. 16 depicts a view illustrating an example of a magnification setting screen displayed upon depression of the scaling key 1321 in the information processing apparatus according to the present embodiment.

The user can designate the magnification within the range of 25% to 800% on this screen.

Returning to FIG. 15, when the paper selection key 1322 is depressed, a screen for output paper selection is displayed. The user can select the size of paper on which printing is performed. A sorter key 1323 is used for designation of sorting method when printing for multiple copies. In this arrangement, the group sort for printing by page or sorting for printing by copy can be selected. Further, a double-sided key 1324 is used for designating whether the original is double sided or printing is to be performed on only one side.

FIG. 17 depicts a view illustrating contents of a table showing functions executable under the control of the first OS and functions executable under the control of the second OS in the information processing apparatus according to the present embodiment.

In FIG. 17, in the first OS 110, the double-sided print function, the FAX function, the printer function and the other functions are disabled. Regarding scaling setting, paper setting and sort setting, only a part of functions thereof are enabled. On the other hand, in the second OS 120, the double-sided print function, the FAX function, the printer function and the other functions are enabled. Further, the scaling setting is enabled in the range of 25% to 800%. Regarding the paper setting, auto paper setting and manual paper selection are enabled. Regarding the sort setting, the group sort (by page) and the sort (by copy) are enabled.

Further, it may be arranged such that the hyper visor 100 launches a third OS (not shown) having other functions in place of the first OS 110 so as to control the information processing apparatus until the second OS 120 is launched. For example, in a case where an application only for use of FAX transmission is installed in the third OS, when the user turns on the power of the information processing apparatus, the information processing apparatus can be started in a status where the FAX function is immediately available by the user's designation using, for example, the operation panel 220. Thus user-friendliness can be improved. In this case, software to emulate the facsimile unit is required.

Figure 12:
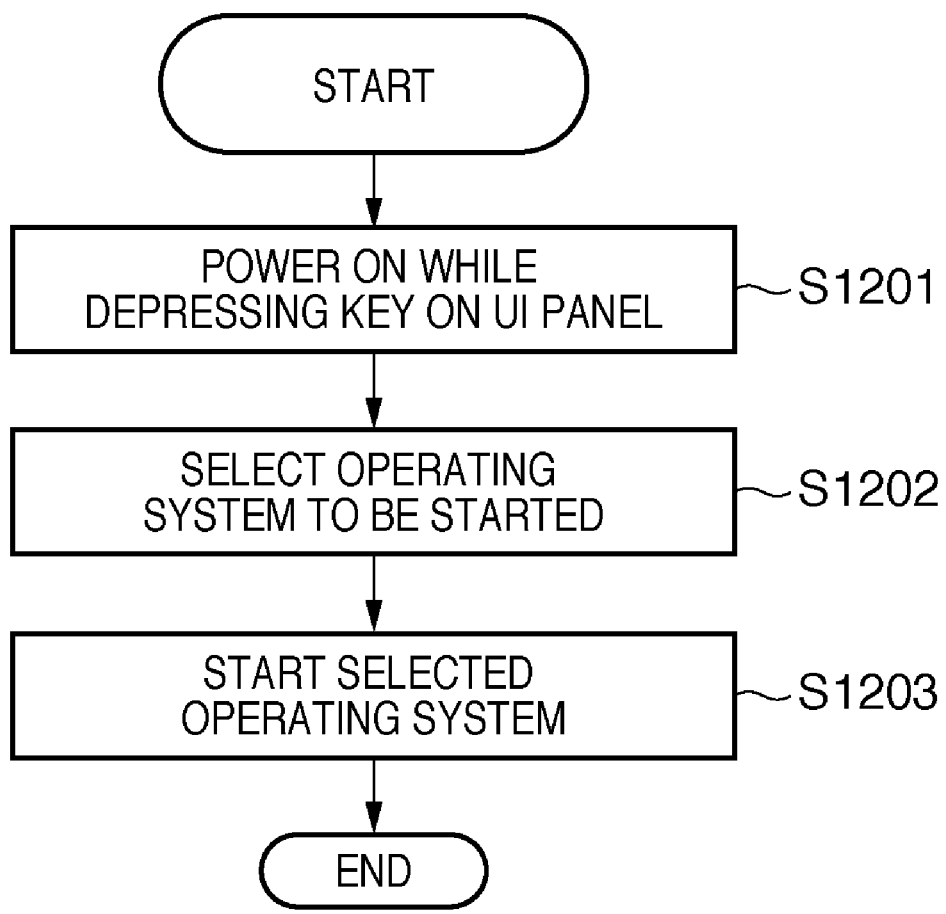
FIG. 12 is a flowchart showing processing for selecting an OS to be first started in the information processing apparatus according to the embodiment.

FIG. 12 is a flowchart showing processing for selecting an OS to be first launched in the information processing apparatus according to the present embodiment.

In step S1201, the user turns on the power of the information processing apparatus while depressing a predetermined key on the operation panel 220. The process proceeds to step S1202, in which point the hyper visor 100 selects an OS to be first launched in correspondence with the key depression status on the operation panel 220. Next, in step S1203, the hyper visor 100 launches the selected OS as described above.

Further, in step S402 in FIG. 4, when the OS booted by the bootstrap loader is the second OS 120, the time before the information processing apparatus becomes controllable by the second OS 120 can be the same as that in conventional techniques. Further, when there is no processing desired by the user upon power on, this startup may be selected.

Further, the CPU 201 may have two execution cores. In this case, the first OS 110 and the second OS 120 can be executed in parallel. In the flowchart of FIG. 5, it is not necessary to wait for the completion of the startup of the first OS 110 in step S504 before loading and launching of the second OS 120. That is, the loading and launch of the second OS 120 can be performed in parallel almost without influence on the startup time of the first OS 110. Since the time from the power on to the control of the information processing apparatus by the second OS 120 can be reduced, the user-friendliness can be further improved.

Other Embodiment

The embodiment of the present invention has been described as above. Note that the present invention can be applied to an apparatus comprising a single device or to a system constituted by a plurality of devices.

Further, the invention can be implemented by supplying a software program, which implements the functions of the foregoing embodiment, directly or indirectly to a system or apparatus, reading the supplied program with a computer of the system or apparatus, and then executing the program code. In this case, so long as the system or apparatus has the functions of the program, the mode of implementation need not rely upon a program.

Accordingly, since the functional processing of the present invention are implemented by computer, the program code installed in the computer also implements the present invention. In other words, the claims of the present invention also cover a computer program for the purpose of implementing the functional processings of the present invention. In this case, so long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiment are implemented by executing the read program by the computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiment can be implemented by this processing.

As described above, according to the present embodiment, the following advantages can be obtained.

(1) As various devices incorporated in the information processing apparatus can be controlled by a first operating system, the startup time of which is short, user-friendliness can be improved.

(2) When an operating system other than the first operating system is launched, the startup time of the first being short, the various devices incorporated in the information processing apparatus can be controlled by the started operating system other than the first.

(3) As the resources such as a memory incorporated in the information processing apparatus utilized by the first operating system, the startup time of the first being short, can be released upon startup of the other operating system, resources can be efficiently utilized.

(4) As the number of devices controlled by the first operating system, the startup time of which is short, can be reduced, a first application operating on the first operating system, the startup time of which is short, can be quickly activated.

The status of the device upon startup of a second operating system other than the first operating system, the startup time of the first being short, can be the same as that when the operating system is activated independently. Accordingly, upon startup of the second operating system, initialization of the device is unnecessary.

(6) A user operation and its result and the like performed in the operating system, the startup time of which is short, are stored in a memory device, and the stored information can be referred to in the other operating system.

(7) When an application in the operating system, the startup time of which is short, is not utilized, the operating system, the startup time of which is short, can be stopped.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-263822, filed Oct. 9, 2007, which is hereby incorporated by reference herein in its entirety.

The invention claimed is:

1. An information processing apparatus having first and second operating systems and a plurality of devices, comprising:

an emulation unit constructed to emulate a particular device controlled by the first and second operating systems among the plurality of devices;

a startup unit constructed to launch the first operating system and the second operating system, wherein a startup time of the second operating system is longer than that of the first operating system;

a halting unit constructed to halt an operation of the first operating system after the completion of the launch of the second operating system by the startup unit; and a management unit constructed to cause the startup unit to launch the first operating system and the second operating system, and after the first operating system has been launched, to cause the first operating system to control the particular device until the launch of the second operating system has been completed by the startup unit, and after the second operating system has been launched, to cause the first operating system to release the particular device and to cause the second operating system to control the particular device emulated by the emulation unit, wherein the plurality of devices are controlled by at least a first application operating on the first operating system and a second application operating on the second operating system, and the second application controls a device which is not controlled by the first operating system but is controlled by the second operating system.

2. The apparatus according to claim 1, further comprising a selection unit constructed to select one of the first and second operating systems as an operating system to be first launched, wherein the startup unit first launches the operating system selected by the selection unit.

3. A control method of controlling an information processing apparatus having first and second operating systems and a plurality of devices, the method comprising:

a first launching step of launching the first operating system;

a second launching step of launching the second operating system, wherein a startup time of the second operating system is longer than that of the first operating system;

a first control step of causing the first operating system to control a particular device until the launch of the second operating system is completed, wherein the particular device controlled by the first operating system is emulated among the plurality of devices;

a halting step of halting operation of the first operating system after the completion of the launch of the second operating system in the second launching step; and after the second operating system has been launched, a second control step of causing the first operating system to release the particular device and causing the second operating system to control the particular device being emulated, wherein the plurality of devices are controlled by at least a first application operating on the first operating system and a second application operating on the second operating system, and the second application controls a device which is not controlled by the first operating system but is controlled by the second operating system.

4. The method according to claim 3, further comprising a selection step of selecting one of the first and second operating systems as an operating system to be first launched, wherein the operating system selected in the selection step is first launched.

* * * * *